(12) United States Patent
Gupta et al.

(10) Patent No.: US 7,295,293 B2
(45) Date of Patent: Nov. 13, 2007

(54) APPARATUS AND METHOD FOR TESTING A REFLECTOR COATING

(75) Inventors: Anurag Gupta, Corvallis, OR (US); Kuohua Wu, Corvallis, OR (US); P. Guy Howard, Junction City, OR (US); Scott A Lerner, Corvallis, OR (US); John Hellgeth, Corvallis, OR (US); Terry Piper, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 68 days.

(21) Appl. No.: 11/256,232

(22) Filed: Oct. 21, 2005

(65) Prior Publication Data

US 2007/0091314 A1  Apr. 26, 2007

(51) Int. Cl.
*G01B 9/00* (2006.01)
(52) U.S. Cl. .................................... 356/124
(58) Field of Classification Search ............... 356/497, 356/511–514, 612, 613, 124–127
See application file for complete search history.

(56) References Cited

U.S. PATENT DOCUMENTS

| | | | | |
|---|---|---|---|---|
| 3,217,170 A | * | 11/1965 | Ho | 250/230 |
| 3,506,361 A | * | 4/1970 | Erickson | 356/513 |
| 4,692,024 A | * | 9/1987 | Bloss | 356/135 |
| 4,699,447 A | * | 10/1987 | Howard | 359/203 |
| 5,056,917 A | * | 10/1991 | Nowacki et al. | 356/124 |
| 5,131,747 A | * | 7/1992 | Cerutti-Maori et al. | 356/456 |
| 5,227,861 A | * | 7/1993 | Nishizawa et al. | 356/497 |
| 5,307,210 A | * | 4/1994 | MacFarlane et al. | 359/859 |
| 5,398,113 A | * | 3/1995 | de Groot | 356/497 |
| 5,467,192 A | * | 11/1995 | Manning | 356/613 |
| 5,706,086 A | | 1/1998 | Lafleur | |
| 5,737,074 A | * | 4/1998 | Haga et al. | 356/237.2 |
| 5,929,992 A | * | 7/1999 | Stenton et al. | 356/511 |
| 6,687,007 B1 | * | 2/2004 | Meigs | 356/456 |
| 2002/0012124 A1 | * | 1/2002 | Nakayama et al. | 356/489 |
| 2004/0223162 A1 | * | 11/2004 | Wax | 356/497 |
| 2004/0257584 A1 | * | 12/2004 | Nishida | 356/512 |
| 2005/0083521 A1 | * | 4/2005 | Kamerman | 356/301 |
| 2006/0033932 A1 | * | 2/2006 | Sezginer | 356/497 |
| 2006/0077395 A1 | * | 4/2006 | Chan et al. | 356/497 |
| 2006/0132799 A1 | * | 6/2006 | Dubois et al. | 356/512 |
| 2006/0238771 A1 | * | 10/2006 | Drabarek et al. | 356/479 |
| 2006/0244973 A1 | * | 11/2006 | Yun et al. | 356/511 |

FOREIGN PATENT DOCUMENTS

| | | |
|---|---|---|
| DE | 40 04 807 A1 | 9/1990 |
| EP | 0 617 092 A2 | 9/1994 |

* cited by examiner

*Primary Examiner*—Tarifur Chowdhury
*Assistant Examiner*—Jonathon D Cook
(74) *Attorney, Agent, or Firm*—Timothy F. Myers

(57) ABSTRACT

A method of testing a coating on a reflector having a first focal point includes placing a mirror at the first focal point of the reflector and angled to orient with an area on the coating. Electromagnetic (EM) radiation is directed to the mirror which then directs the EM radiation on the area. The EM radiation which is reflected from the coating is collected onto a sensor disposed at a second focal point. The intensity of the EM radiation collected on the sensor is detected.

33 Claims, 7 Drawing Sheets

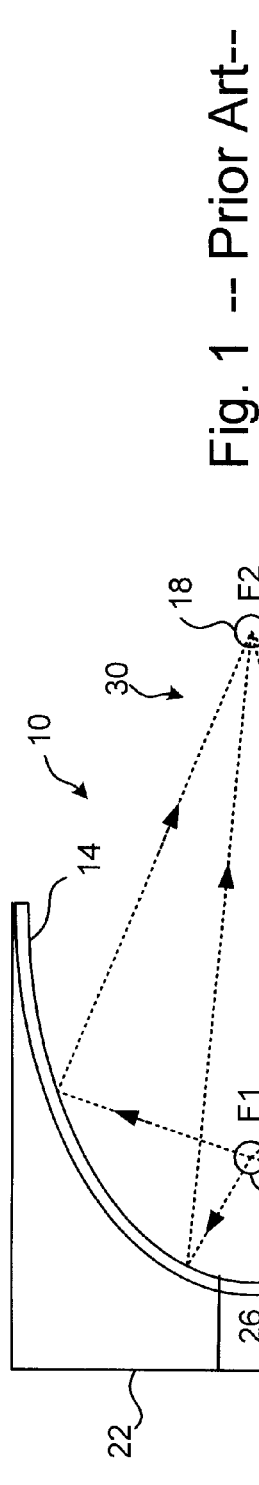
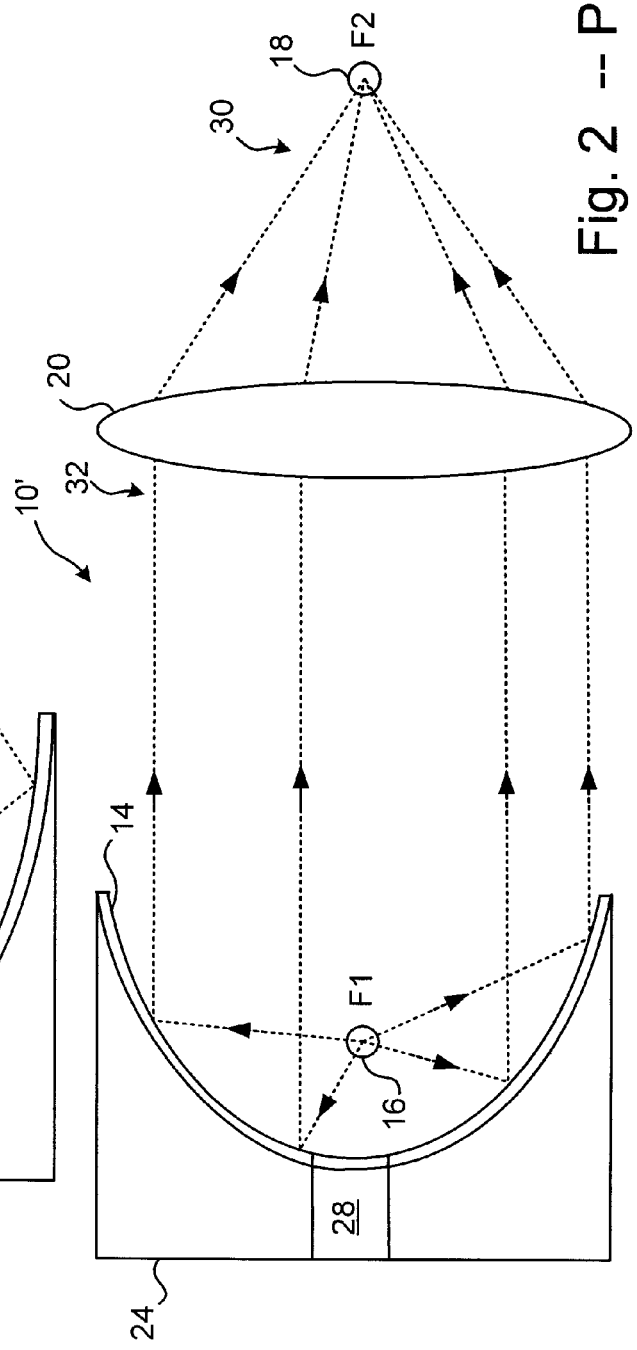
Fig. 1 -- Prior Art--
Fig. 2 -- Prior Art--

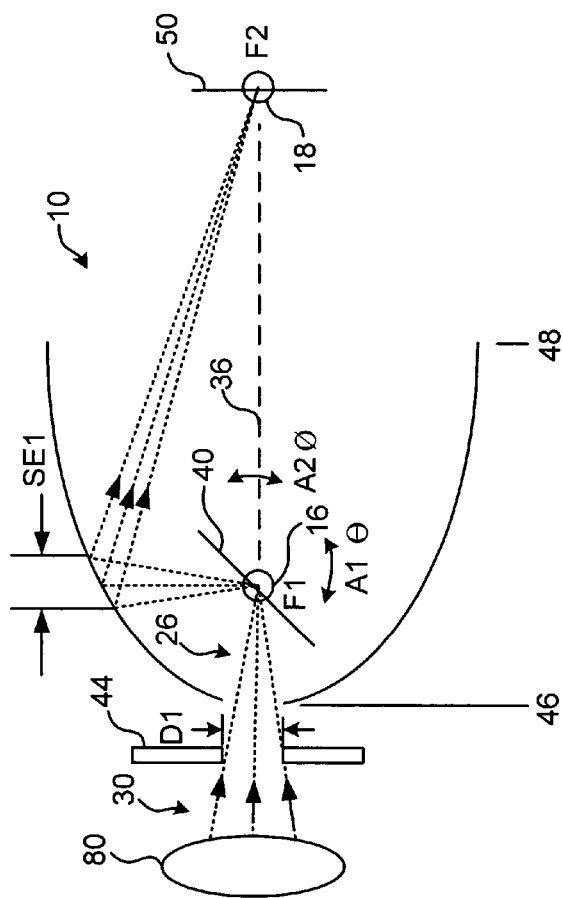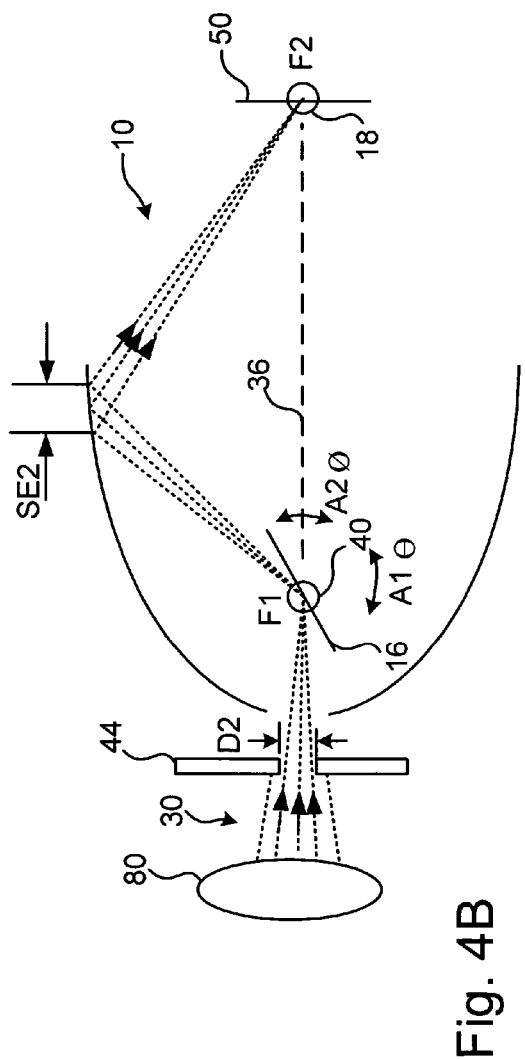

APPARATUS AND METHOD FOR TESTING A REFLECTOR COATING

CROSS REFERENCES TO CO-PENDING APPLICATION

This Application is related to U.S. patent application Ser. No. 11/176,028, filed Jul. 6, 2005 and further related to U.S. patent application Ser. No. 11/074,490, filed Mar. 7, 2005 and further related to U.S. patent application Ser. No. 11/179,117, filed Jul. 12, 2005 all of which are hereby incorporated by reference in their entirely.

BACKGROUND

Many projection systems and other imaging devices incorporate high intensity arc-light sources that have small point sources that are called "fireballs." The fireball is usually located within a concave reflector that has a focal point, such as a parabolic, elliptical, or other curved shaped mirror. The light emanating from the fireball in the focal point is reflected off the surface of reflector. Often times the reflector is made of a glass, metal, or other substrate that requires a special coating to be applied to provide a specular surface for reflection. When the reflector is fabricated, the special coating may be deposited, sprayed, dipped, painted, or otherwise applied to the reflector surface. The quality of the special coating may need to be determined to ensure that the special coating was applied properly. For instance, the amount of reflection at various wavelengths may need to be determined. Further, the consistency of the reflective surface may need to be examined over a substantial portion of the special coating.

Prior inspection techniques used a fiber source at the focal point of the reflector. The fiber source was oriented to allow light escaping it to scan across the surface of the reflector while with difficulty maintaining the fiber's spatial position at the focal point. Another problem with using an optical fiber included not being able to control the angular spread of the emerging light beam which causes the spatial extent (area) of the scanned region on the reflector surface to vary based on the relative tilt of the fiber.

Accordingly, a more flexible and efficient method of testing the reflective coating is needed to lower the cost and increase the quality of reflectors used for arc light sources. Having a better method of testing will ensure rapid alignment and accurate testing of reflector surfaces.

BRIEF DESCRIPTION OF THE DRAWINGS

The accompanying drawings illustrate various embodiments of the present apparatus and method and are a part of the specification. The illustrated embodiments are merely exemplary embodiments of apparatuses and methods and do not limit the scope of the disclosure. Throughout the drawings, identical reference numbers designate similar, but not necessarily identical, elements.

FIG. 1 is an exemplary cross-section of an embodiment of an elliptical reflector.

FIG. 2 is an exemplary cross-section of an embodiment of a parabolic reflector and a condensing lens.

FIG. 4A is an exemplary schematical cross-sectional embodiment of an improved testing method in one functional state.

FIG. 4B is an exemplary schematical cross-sectional embodiment of an improved testing method in a second functional state.

DETAILED DESCRIPTION

Figure 3:
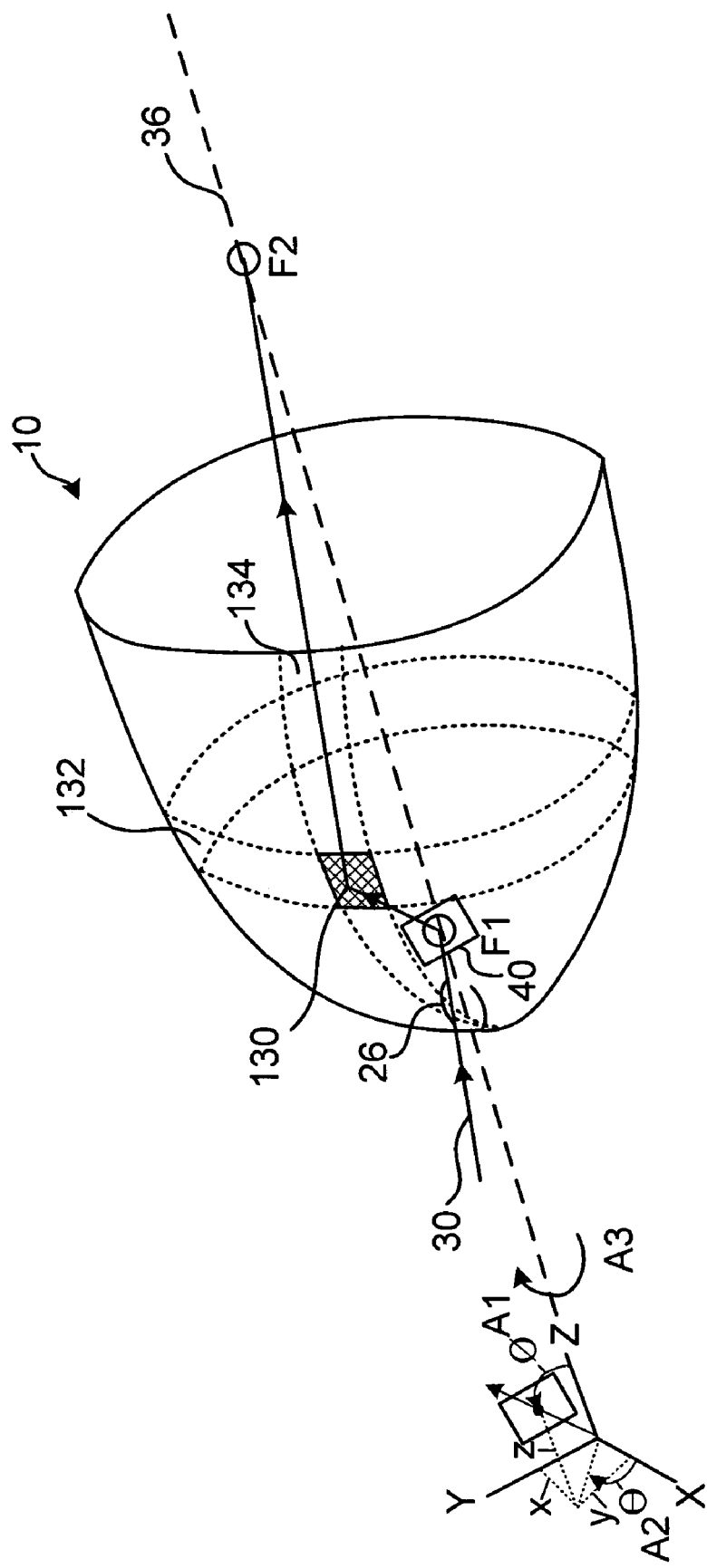
FIG. 3 is a illustration of an exemplary reflector with respect to a spherical coordinate system to select a latitude and longitude on an area on the reflector coating to test.

To better examine reflective coatings, a mirror is positioned at a focal point of a concave mirror used as a lamp reflector to "fold" light from the focal point to an area or portion on the concave mirror surface. This "fold mirror" is allowed to rotate on at least one axis to allow light reflected from it to scan multiple discrete areas of the concave mirror surface. In some instances, the concave mirror has a lamp opening for a replaceable or fixed bulb. In other embodiments, a test unit, sampled from a production lot, has a hole drilled, bored, milled, or otherwise opened within it to allow external electromagnetic (EM) energy (radiation) to become incident on the fold mirror. The fold mirror is preferably a front surface mirror with an all-band metal reflective coating such as an aluminum or silver deposition. Alternatively, the fold mirror may be formed of dielectric or other coatings as required.

The fold mirror may be attached to an opto-mechanical assembly that holds the fold mirror in an external attachment that is brought to the required position from the wide opening of the concave mirror. The fold mirror rotates or tilts in one or more directions about its center which is located at the focal point of the concave mirror. The fold mirror's rotation can be done in discrete or continuous steps to scan the surface of the concave mirror. Alternatively, the fold mirror can be positioned to a known orientation and the concave mirror can be held in a rotating fixture to allow rotation about its optical axis.

To limit the spatial extent (SE, the area of incident EM on the concave mirror surface) of the EM energy reaching the concave mirror from the fold mirror, the EM energy entering the opening to the fold mirror can be adjusted by an iris or other f-stop mechanism to limit the angular spread (solid angle) of the incoming EM radiation. During scanning of the reflective surface of the concave mirror, the f-stop mechanism can be continuously adjusted with respect to the tilt of the fold mirror to maintain a substantially constant spatial extent across the reflective surface of the concave mirror.

There are several methods of ensuring that the concave reflector and fold mirror are aligned properly in a test setup. One is to create a 'test' optical axis between the EM source and a center of the detector. The optical axis of the concave reflector is oriented along the test optical axis using some form of mechanical dimensioning. The fold mirror is then positioned such that its rotational center is placed at or near the focal point of the concave mirror. The fold mirror then is used in conjunction with EM sources and the sensor to maximize the output of the sensor while either adjusting the (x, y, z) position of the fold mirror center location and the transverse (x, y) positioning of the concave reflector using the mechanical dimensioning. The rotational center of the fold mirror is disposed at the focal point of the concave mirror when the sensor signal is maximized.

FIG. 1 is an exemplary cross-sectional view of a concave reflector with a partial elliptical surface to form an elliptical reflector 10. On the elliptical surface is an optical coating 14 which forms at least a reflective surface for a portion of electromagnetic energy (EM). For instance, the optical coating 14 may be designed to reflect visible wavelengths of light in the 380 nanometer (nm) to 830 nm region or thereabouts. In addition, the optical coating 14 may be designed to pass-through EM energy outside the visible region in at least one of the infra-red (IR) or ultraviolet (UV) regions to a heat absorptive surface or substrate. Thus, the optical coating 14 might be designed as desired to either reflect or absorb one or more bands EM energy from the 250 nm to 15 micrometer (um) wavelengths.

A full ellipse has two foci that are conjugates. In the partial elliptical reflector shown, a arc-lamp is disposed in the elliptical reflector 10 such that its fireball in operation is positioned at a first focus F1 16. EM energy 30 that is emitted from the fireball at F1 is reflected off of the optical coating 14 and collected at the conjugate second focus F2 18.

FIG. 2 illustrates an alternative concave reflector, a parabolic reflector 10'. EM energy 30 from a fireball disposed at the first focus F1 16 is reflected from the optical coating 14 to create a set of collimated EM energy 32. A condenser lens 20 is used to collect the EM at the conjugate second focus F2 18. Although both elliptical and parabolic reflectors have been illustrated and described, those of skill in the art will appreciate that other concave reflectors having a curved shape with a focus and appropriate optics to form a conjugate second focus F2 18 can be tested by the test apparatuses described herein. For the sake of clarity, the remaining description of the test apparatuses and methods will be described using mainly the elliptical reflector, however, the test apparatus can be used in conjunction with parabolic and other reflector shapes.

The reflectors 10, 10' may be formed in a glass, metal (e.g. aluminum or copper) or other solid substrate (e.g. ceramic or quartz) to form an elliptical body 22 or a parabolic body 24. The reflector bodies 22, 24 may contain an opening 26 to receive a bulb such as a mercury-arc bulb. Alternatively, the reflector body may have only a small hole or be solid and thus a reflector may be sampled (selected from a set produced in the same process lot) and a hole 28 created to allow EM energy 30 from a test apparatus to enter the reflector cavity.

FIG. 3 illustrates an exemplary reflector 10 with respect to a spherical coordinate system used herein to describe selection of a test area by a latitude and longitude through the use of rotation of the fold mirror 40 or reflector 10. Alternatively, an XYZ or other coordinate system can be used and the position of fold mirror 40 translated accordingly. EM energy 30 is directed through opening 26 in the reflector 10 to strike and reflect off fold mirror 40 to a selected area 130 at a desired latitude 132 and a desired longitude 134. The desired latitude 132 is selected by a rotation of fold mirror 40 located at the focal point of the reflector around a latitude angle Ø A1. In this example, the Z axis is aligned with the optical axis 36 of the reflector 10 to allow rotation of fold mirror 40 about a longitude angle θ A2. Alternatively, the reflector 10 can be rotated about its optical axis with an equivalent optical axis angle A3 by a roller or other mechanism. The EM energy 30 may be partially absorbed and reflected within various EM energy wavelength bands depending on how the coating is applied.

The reflected EM energy 30 from the selected area 130 is collected at a second focal point F2 where a sensor is ideally located. If the reflector 10 is elliptical, the collection is inherent due to the shape of the reflector. If the reflector 10 is parabolic, a condenser lens can be used to collect the EM energy at focal point F2. For other reflector shapes, appropriate optics can be used to collect the EM energy to focal point F2.

FIG. 4A is an exemplary schematical cross-sectional embodiment of an improved testing method that incorporates a fold mirror 40 in a first functional state in reflector 10. EM energy 30 is focused, for example with a condensing lens 80, onto the fold mirror 40 at the first focal point F1 16. The fold mirror 40 is positioned such that its reflective surface intersects the first focal point F1 16. The fold mirror 40 is rotatable through at least a first angle A1(θ, a latitude or polar angle in a spherical coordinate system) to select an area or spatial extent SE1 on the reflective surface of reflector 10. Thus, the fold mirror 40 receives EM energy 30 through opening 26 and by a choice of first angle A1 directs the EM energy 30 onto an area within a latitude between proximal end 46 and distal end 48 of reflector 10. The size of the area can be controlled by the angle of EM energy 30 entering opening 26 or through the limitation of the angle of EM energy 30 using an iris 44 that is set at a first diameter D1. To select alternative areas within the same latitude on reflector 10 it may be rotated about its optical axis A3 (the line that passes between first focal point F1 16 and second focal point F2 18). Alternatively, the fold mirror 40 may be configured to rotate through a second angle A2 (Ø, a longitude or azimuth angle in a spherical coordinate system) to select a longitude on the reflective surface within the selected latitude. EM energy 30 that reflects off the reflective surface of the reflector 10 is collected at the second focal point F2 18 at which a sensor 50 is disposed. The sensor 50 may be a single or multiple set of sensors. The sensor 50 may have one or more elements arranged in an array or otherwise to determine not only the intensity of the EM energy 30 reaching it but also its size to detect focus. Additionally, other parameters measured might include frequency and phase of the EM energy 30. The sensor 50 may be controlled by a controller to select an appropriate sub-sensor from a set of sensors depending on the type of EM energy 30 that is used to characterize the reflective surface of reflector 10.

FIG. 4B is an exemplary schematical cross-sectional embodiment of the improved testing method FIG. 4A with fold mirror 40 in a second functional state in which the first angle A1 is rotated to select a latitude that is closer to the distal end 48 of reflector 10. Because the EM 40 has an angular distribution and it has to travel a larger distance to the reflective surface near the distal end 48 of reflector 10, the spatial extent SE2 may be larger than SE1. To compensate for this increase in spatial extent, the iris 44 may be adjusted to a smaller diameter D2 to limit the angular spread of EM energy 30. Thus, if desired, the area sampled on the reflective surface of reflector 10 can be substantially maintained to simplify analysis of the received sensor data.

Figure 5:
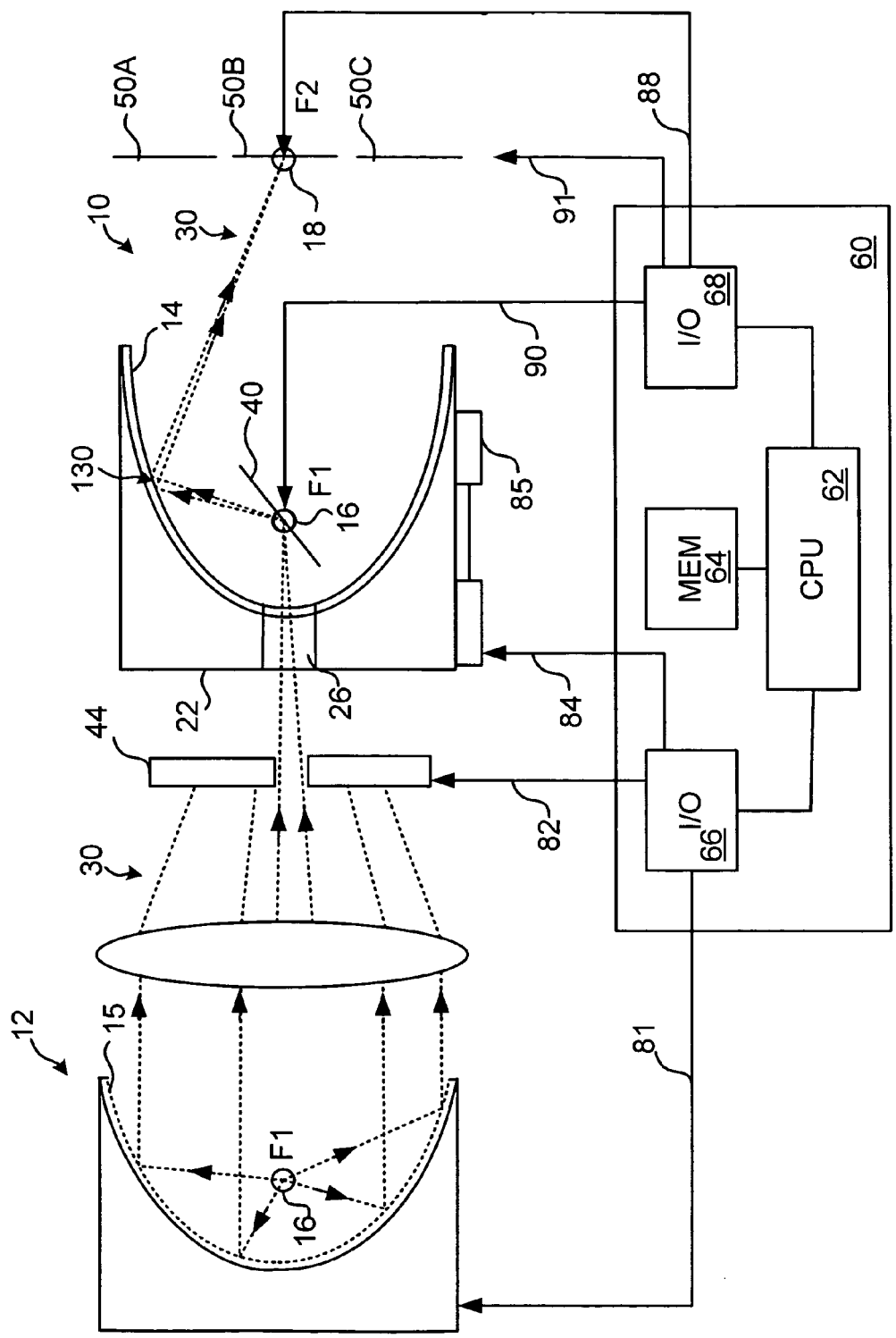
FIG. 5 is an exemplary block diagram of an apparatus to implement the improved testing method shown in FIGS. 4A and 4B.

FIG. 5 is an exemplary block diagram of an apparatus to implement the improved testing method shown in FIGS. 4A and 4B using a wide band EM source 12 and one or more sensors 50A-50C. The wide band EM source 12 may be a Xenon or mercury arc light source for instance that generates EM emissions from far IR to UV. The wide-band EM source 12 may be formed with a wide band reflective coating 15, such as an aluminum or silver film on the reflector surface. In this example, the wide band EM source 12 is formed in a parabolic cavity to create a collimated EM source that is condensed with a lens to create EM energy 30. The solid angle or angular extent of EM energy 30 is limited by an f-stop mechanism, iris 44. The EM energy 30 that passes through iris 44 is focused through opening 26 to a first focal point F1 16 of a reflector 10 which is under test. Reflector 10 is an elliptical shaped reflector in body 22 with an optical coating 14 which is desired to be characterized to ensure it has been manufactured properly. A fold mirror 40 is disposed at the first focal point F1 16 and oriented at an azimuth angle to select a longitude of a selected area 130. The longitude of the selected area 130 is determined by rotation of reflector 10 about its optical or polar axis by roller mechanism 85. EM energy 30 is absorbed or reflected by the optical coating 14 and is collected on one of sensors 50A-50B disposed at a second focal point F2. For example, sensor 50A may be sensitive to IR energy, sensor 50B to visible light, and sensor 50C to UV energy.

A controller 60 includes a central processing unit (CPU) 62, memory 64 and input/output logic 66 and 68. The controller 60 can be used to implement the methods described below to implement the testing of the optical coating. The method may be embodied at least in part in any computer readable media for use by or in connection with an instruction execution system on CPU 62 or in logic circuits. "Computer readable media" can be any media that can contain, store, or maintain programs and data for by or in connection with the instruction execution system. Computer readable media such as memory 64 can include any one of many physical media such as, electronic, magnetic, optical, electromagnetic, infrared, or semiconductor media. Specific but not exclusive suitable computer readable media include a portable computer diskette, hard drives, compact discs, or DVD discs. Semiconductor memory includes, but is not limited to, DRAM, SRAM, EEPROM, FLASH, one time programmable, read only memory, and the like.

The CPU 62 can control the wide band EM source 12 such as through signal 81. The iris 44 can be controlled by a peripheral interface 84 and likewise the roller mechanism 85 by control bus 84. The CPU can select the angle of the fold mirror 40 by use of a fold mirror link 90. The sensors 50A-50C can be controlled with computer interface I/O links 88-89 to read analog or digital data depending on the sensors used and to control the selection of the desired sensor during the test. The various I/O, peripheral, sensor, and controller interfaces used in embodiments may include but are not limited to LVDS (low voltage differential signaling), Ethernet, SDI (serial digital interface), SDV (serial digital video), various IEEE 1149 test solutions, USB (universal serial bus), Bluetooth, and standard or custom UART interfaces, just to name a few.

Figure 6:
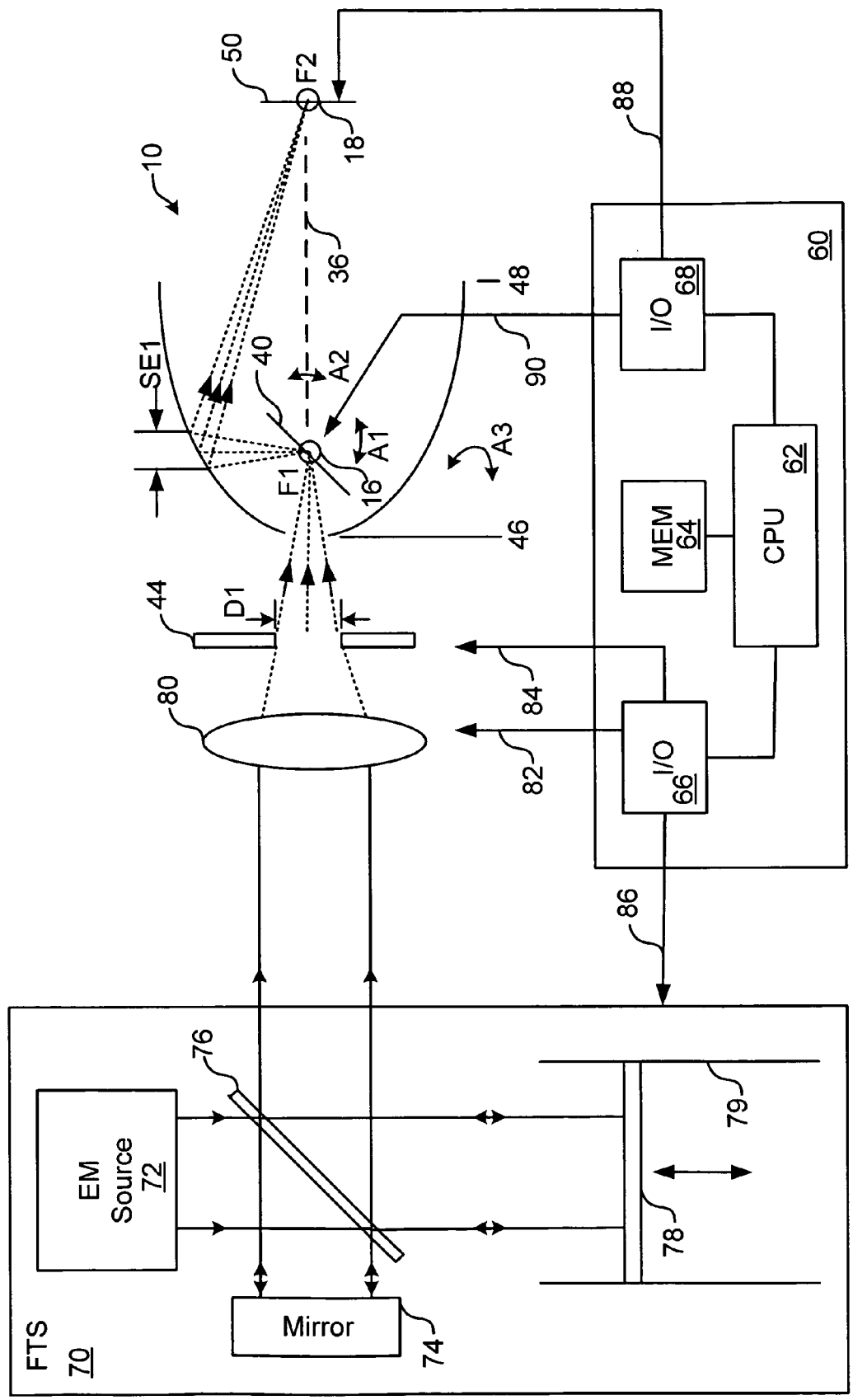
FIG. 6 is an exemplary block diagram of an alternative apparatus to implement the improved testing method shown in FIGS. 4A and 4B.

FIG. 6 is an exemplary block diagram of an alternative apparatus to implement the improved testing method shown in FIGS. 4A and 4B using a Fourier Transform Spectrometer (FTS) 70. A Fourier transform is a mathematical operation used to translate information taken in the time domain to information that is represented in the frequency domain. In the FTS 70, an interferogram is generated by sensing constructive and destructive interferences generated by overlapping EM waves. The Fourier transform of the interferogram is then used to create a graph of the magnitude of the frequency components that are present in the sensed EM waves. In one embodiment, the FTS 70 includes at least one EM source 72, for instance an infrared (IR), an ultraviolet (UV), or a visible light source. The FTS 70 also includes a beam splitter 76 which in one embodiment may reflect 50% of the EM received and transmit 50% of the EM received.

EM reflected from the beam splitter 76 is directed to a fixed mirror 74 located at a known distance and the EM reflected back to the beam splitter 76. EM transmitted from the beam splitter 76 is directed to a movable mirror 78 that is controllable along a track 79. EM reflected from the movable mirror 78 is directed back to the beam splitter 76, combined with the EM from the fixed mirror 74 and directed ultimately to sensor 50 after being reflected from a portion (designated area) of the reflective surface of reflector 10. Sensor 50 may be part of FTS 70, separate from FTS 70, or a combination of a separate sensor and sensors from FTS 70. FTS 70 may be a commercially available device or it may be made of individual components as required.

The interferogram is generated at sensor 50 because of the recombination of the EM from the fixed mirror 74 and movable mirror 78 at the beam splitter 76. To create the interferogram, the movable mirror 78 is moved at a constant speed while the sensor 50 is sampled at a uniform rate. As the intensity of the EM received at the sensor 50 is detected and recorded, the movable mirror 78 is directed towards or away from the beam splitter 76. The recorded sensor data is the interferogram that is Fourier transformed into the respective frequency data. Because the combined EM from the beam splitter 76 is passed through condenser lens 80 and iris 44 to the reflective surface of reflector 10, the filtering aspects of the reflector surface on reflector 10 can be characterized and compared to an ideal or known representative data set.

To allow the characterization to be implemented over a large portion of the reflective surface of reflector 10, a controller 60 is used in conjunction with the fold mirror 40, iris 44, sensor 50 and FTS 70 to scan the EM beam over a set of first angles A2 (longitude) and a set of second angles A1 (latitude) from the proximal end 46 to the distal end 48 of reflector 10. The controller 60 includes a central processing unit (CPU) 62 which may be a personal computer, microprocessor, digital signal processor, workstation, flow controller, discrete logic, or other programmable controller. The CPU 62 receives computer executable instructions form a computer readable memory 64. The computer readable memory may be any type of memory including magnetic or optical disc storage, dynamic refreshable memory, static memory, flash memory, or other electronic memory storage. The CPU 62 also interfaces to various input/output (I/O) logic to allow it to control the different components of the test system. For example, the CPU 62 may have a computer interface bus 86 to control the operation of the FTS 70. CPU 62 may also be able to control the focus of condenser lens 80 through an optic bus 82 and the iris 44 opening D1 through a peripheral interface 84. If the sensor 50 is part of FTS 70, the CPU may access it from the computer interface bus 86. If the sensor 50 is separate from the FTS 70 or in addition to it, the CPU 62 may access the sensor 50 on a separate sensor link 88. The fold mirror 40 may have at least one angle such as angle A1 or A2 controlled through fold mirror link 90. Fold mirror link 90 may control an additional axis of rotation of fold mirror 40 or it may control also a motor or other mover to rotate the reflector 10 about its optical axis such as with A3 which may be equivalent to A2.

Figure 7:
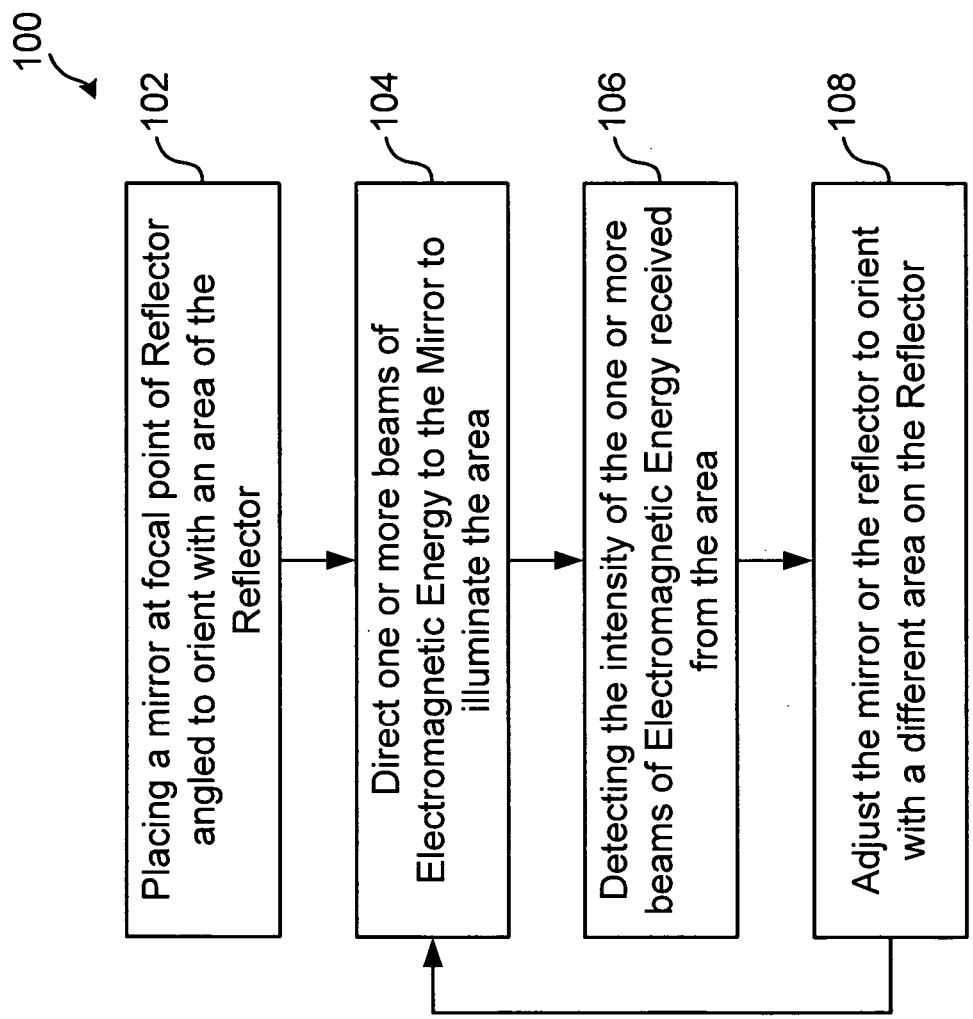
FIG. 7 is an exemplary flow chart of an exemplary method of implementing the improved test.

FIG. 7 is an exemplary flow chart of an exemplary method 100 of implementing the improved test. In block 102, a folding mirror 40 is placed at the focal point of the reflector 10. The folding mirror 40 is angled to orient or otherwise align the folding mirror 40 with a designated area on the reflective surface of the reflector 10. The folding mirror may be oriented and adapted to allow for rotation about one or more axis of rotation. In one embodiment, one axis of rotation allows the folding mirror 40 to be oriented with an area along a designated latitude of the concave reflector 10. In another embodiment, one axis of rotation allows the folding mirror 40 to be oriented with an area along a designated longitude of the concave reflector. In this last embodiment, the folding mirror 40 may include an additional axis of rotation to allow for orientation with a designated latitude region of the reflector 10. Alternatively, the selection of the area within a desired longitude region can be selected by rotation of the reflector 10 around its optical axis and latitude selected by an axis of rotation of the fold mirror 40.

In block 104, one or more beams (wavelength bands) of electromagnetic energy is directed onto the fold mirror and reflected there from to illuminate the desired area on the reflector 10. The one or more beams of electromagnetic energy (EM) can be performed at the same time (such as by using a broadband light source, e.g. white light) or it can perform in a sequential manner (such as by selecting increasingly higher or lower frequencies of electromagnetic energy ranging from the IR to the UV spectrum). If desired, an iris 44 can be used to limit the spatial extent of the EM. If the reflector 10 is designed with an opening to allow for insertion of a light source, the opening can be used to direct the EM beams to the fold mirror 40. If not or required, an opening can be made or widened such as by drilling, boring, or milling as required.

In block 106, the intensity of the one or more beams of EM energy that is received from the area on a sensor or set of sensors is detected. From the detected data, the performance of the reflective coating over a range of frequencies can be determined and compared to a reference data set to ensure that the coating was applied properly in that area. If a single band of EM energy is used, a single detector for that band can be used to record an intensity reading. If a wide-band light source is used, the one or more sensors can be used to detect various bands of frequencies within the wide-band source range. Alternatively, various filters can be placed in front of a wide-band sensor to limit the band of wavelengths detected for a particular reading.

In block 108, the folding mirror 40 or the reflector 10 is adjusted to orient with a different area on the reflector 10. The folding mirror 40 can be adjusted in one or two angles as capable. Alternatively, the reflector 10 can be rotated about its optical axis to perform part of the adjustment. After the adjustment is made to orient the folding mirror 40 to a different area, the steps in blocks 104 to block 108 can be repeated as necessary.

Figure 8:
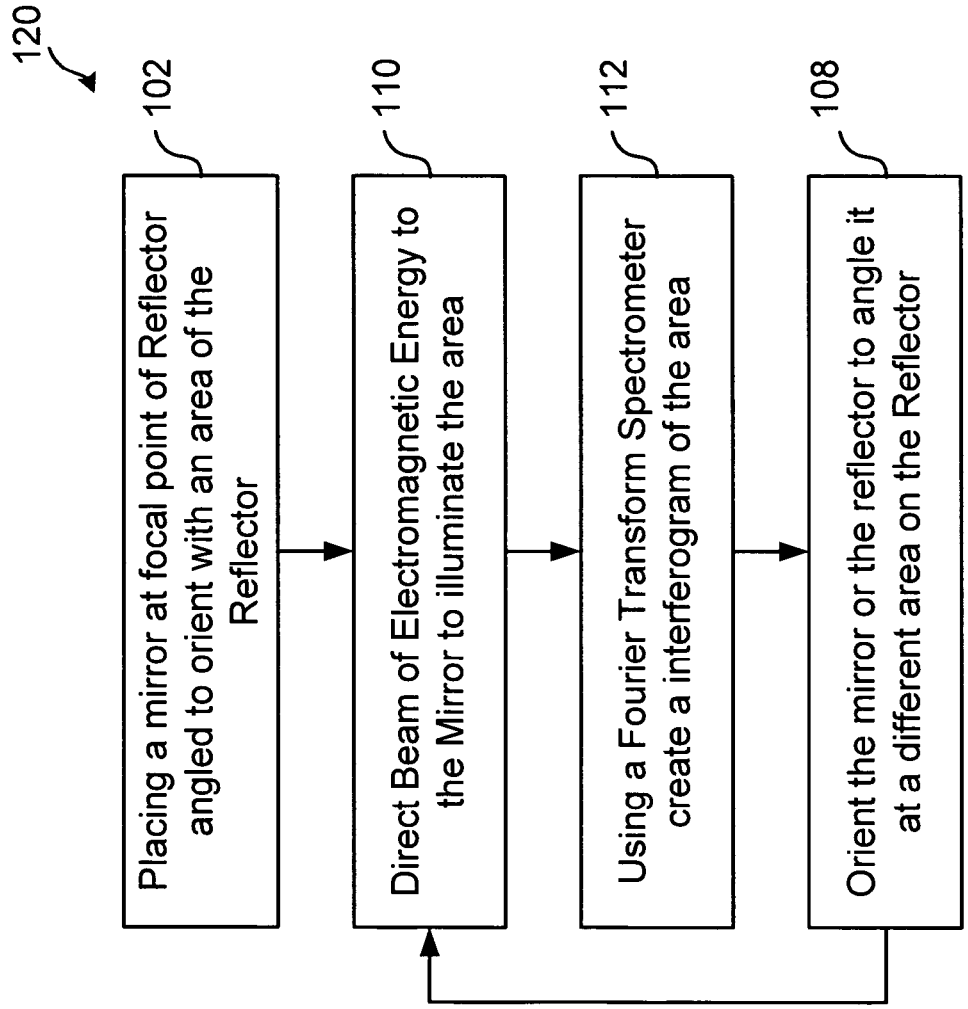
FIG. 8 is an exemplary flow chart of a method of using a rotational mirror in combination with a movable mirror to test a reflective surface with an interferogram.

FIG. 8 is an exemplary flow chart of a method 120 of using a rotational mirror in combination with a movable mirror to test a reflective surface. In this method, rather than directing a set of individual light sources to the reflector or using a wide-band light source with multiple sensors, a movable mirror is used in combination with the rotational mirror to create an interferogram. The interferogram is then used with a Fourier transform to create as set of frequency intensities.

In block 102, the folding mirror 40 is placed at the focal point of the reflector 10 as described for FIG. 7. In block 110, a wide-band beam of EM is directed to the folding mirror 40 to ultimately illuminate the desired area on the reflector 10. For instance, a wide-band of IR, visible light, or UV or combinations thereof may be directed to the folding mirror.

In block 112, a Fourier transform spectrometer or equivalent is used to create an interferogram for the desired area of the reflector 10. The Fourier transform spectrometer as shown in FIG. 6 has a moving mirror 78 that is adjusted along a rail 79. EM energy from EM source 72 is combined at the beam splitter 76 with EM that is reflected from a stationary mirror 74. This combined EM is directed to condensing lens 80 which focuses the combined EM energy onto the focal point F1 16 of the reflector 10. To maintain the spatial extent of the area over the reflector surface, an iris 44 can be used with respect to the angular position of the fold mirror 40 to maintain a substantially uniform spatial extent SE1 over the concave surface of the reflector 10. The combined EM energy that is reflected from the fold mirror 40 is directed onto the desired area of the reflector 10 and then re-reflected and collected at the second focal point F2 at which the sensor 50 is located. The size of the EM pattern sensed at sensor 50 can be used to determine that the shape of the reflector has been maintained properly during coating. As the movable mirror is adjusted, the intensity of the EM energy detected at sensor 50 will vary as the various frequencies within the combined EM energy are constructively or destructively combined. The resulting recording of sensor 50 over the travel of the movable mirror 78 in one direction will create an interferogram. The interferogram can be used with a Fourier transform conversion program to create a set of frequency intensity levels that can be used to characterize the performance of the reflective coating on reflector 10 with respect to a reference set of data.

At step 108, as in FIG. 7, the folding mirror 40, the reflector 10, or both can be oriented to angle the folding mirror to a different area of the reflector 10. One methodology of mapping the surface of the reflector 10 is to adjust the mirror through a set of rotations at each latitude for each adjustment of the mirror or reflector for each longitude. Alternatively, another methodology is to adjust of the mirror or reflector through a set of rotations of the longitude for each adjustment of the mirror for each latitude. To ensure proper location of the desired area under test, the reflector 10 may have mechanical or optical indicators to ensure for aligning the reflector to a known orientation before the test is performed.

Although the flow diagrams of FIGS. 7 and 8 illustrate specific orders of execution, the orders of execution may differ from that depicted. For example, the order of execution of two or more blocks may be scrambled relative to the order shown. Also, two or more blocks shown in succession may be executed concurrently or with partial concurrence. All such variations are within the scope of the claimed methods and apparatuses.

The preceding description has been presented only to illustrate and describe exemplary methods and apparatuses. It is not intended to be exhaustive or to limit the disclosure to any precise form disclosed. Many modifications and variations are possible in light of the above teaching. It is intended that the scope of the disclosure be defined by the following claims.

What is claimed is:

1. A method of testing a coating on a reflector having a first focal point and a conjugate second focal point created by at least one of curvature of the reflector and appropriate optics, comprising:

placing a mirror at the first focal point of the reflector and angled to orient with an area on the coating;

directing electromagnetic (EM) radiation to the mirror which then directs the EM radiation on the area;

collecting the EM radiation which is reflected from the coating onto a sensor disposed at the conjugate second focal point;

detecting the focal point size of the incident EM radiation on the sensor;

detecting at least one of the intensity, frequency, and the phase of the EM radiation collected on the sensor; and processing the detected EM radiation to characterize the area of the coating.

2. The method of claim 1 further comprising creating a hole from an exterior of the reflector to the first focal point.

3. The method of claim 1, further comprising adjusting the mirror or the reflector to orient the mirror at a different area on the coating.

4. The method of claim 1, further comprising:

adjusting the mirror through a set of rotations over different latitudes; and adjusting the mirror or reflector through a set of rotations over different longitudes.

5. The method of claim 4 wherein adjusting the mirror through a set of rotations different latitudes occurs for each adjustment of the mirror through the set of rotations over different longitudes.

6. The method of claim 4 wherein the adjusting of the mirror through the set of rotations over different longitudes occurs for each adjustment of the mirror through the set of rotations of over different latitudes.

7. The method of claim 1 wherein directing the EM radiation includes directing at least one of infrared, ultraviolet, and visible light ranges at the area of the coating.

8. The method of claim 1 wherein directing the EM radiation includes directing a broad-band of wavelengths ranges at the area of the coating.

9. The method of claim 1 further comprising adapting the sensor to detect a particular wavelength of the EM radiation.

10. The method of claim 1 further comprising using a Fourier transform spectrometer to create an interferogram of the EM radiation detected from the area of the coating.

11. The method of claim 1 further comprising aligning the reflector to a known orientation.

12. The method of claim wherein collecting the EM radiation includes focusing the EM radiation onto the conjugate second focal point with a condenser lens.

13. The method of claim 1 wherein directing the EM radiation to the first focal point includes limiting the angular range of the EM radiation.

14. An apparatus to test a coating on a reflector having a first focal point and a conjugate second focal point created by at least one of curvature of the reflector and appropriate optics, comprising:

a source creating electromagnetic (EM) energy;

a mirror disposed at the first focal point and receiving the EM energy;

a mechanism to orient the mirror to direct the received EM energy to an area of the coating;

a sensor located at a second focal point to receive EM energy reflected off the area of the coating to detect the focal point size of the incident EM radiation on the sensor; and a controller configured to process the received EM radiation to characterize the area of the coating.

15. The apparatus of claim 14 wherein the mirror receives the EM energy through an opening in the reflector.

16. The apparatus of claim 14 wherein the mechanism to orient the mirror allows for at least one axis of rotation.

17. The apparatus of claim 14, further comprising a second mechanism to orient the mirror by rotation of the reflector about its optical axis.

18. The apparatus of claim 14 further comprising a Fourier transform spectrometer that includes the source creating EM energy.

19. The apparatus of claim 14 wherein the sensor includes a set of wavelength selective sensors.

20. The apparatus of claim 14 further comprising an f-stop mechanism in the optical path of the EM energy before the mirror capable of limiting the angular spread of the EM energy.

21. The apparatus of claim 14 wherein the controller is further configured to orient the mirror and receive the intensity from the sensor.

22. The apparatus of claim 14 further comprising a condenser lens in the optical path of the EM energy before the mirror configured to focus the EM energy at the first focal point.

23. The apparatus of claim 14 further comprising a condenser lens in the optical path of the EM energy after reflection from the coating configured to focus the reflected EM energy at the conjugate second focal point.

24. An apparatus for testing the coating on a reflector having a first focal point and a conjugate second focal point created by at least one of curvature of the reflector and appropriate optics, comprising:

means for generating electromagnetic (EM) energy focused on the first focal point of the reflector;

means for reflecting the EM energy at the first focal point of the reflector to an area on the coating;

means for detecting at the conjugate second focal point the focal point size and amount of EM energy reflected off the coating; and means for processing the detected EM radiation to characterize the area of the coating.

25. The apparatus of claim 24 further comprising means for limiting the angular range of the EM energy focused on the first focal point.

26. The apparatus of claim 24 further comprising means for providing an interferogram of the EM energy of the EM energy reflected off the coating.

27. The apparatus of claim 24 further comprising means for controlling the angular position of the means for reflecting in at least two axis of rotation.

28. The apparatus of claim 27 further comprising means for controlling the means for generating EM energy, the means for controlling the angular position, and the means for detecting.

29. The apparatus of claim 25 further comprising means for controlling the focusing of the EM energy reflected from the coating onto the means for detecting.

30. An apparatus to test a coating on a reflector having a first focal point and a conjugate second focal point created by at least one of curvature of the reflector and appropriate optics, comprising:

means for locating a mirror at the first focal point oriented to select an area on the coating of the reflector, the area having a spatial extent;

means for generating electromagnetic energy (EM) that is focused at the first focal point to reflect off the mirror to the area on the coating of the reflector;

means for sensing at the conjugate second focal point EM energy reflected off the coating of the reflector including means for detecting the area of a cross-section of the EM energy at the means for sensing; and means for processing the sensed EM radiation to characterize the area of the coating with respect to a reference set of data.

31. The apparatus of claim 30, further comprising means for limiting the is spatial extent of the EM energy.

32. The apparatus of claim 30, further comprising means for creating an interferogram of the EM energy detected by the means for sensing.

33. An apparatus to test a coating on a reflector having a first focal point and a conjugate second focal point created by at least one of curvature of the reflector and appropriate optics, comprising:

means for locating a mirror at the first focal point oriented to select an area on the coating of the reflector, the area having a spatial extent;

means for generating electromagnetic energy (EM) that is focused at the first focal point to reflect off the mirror to the area on the coating of the reflector;

means for sensing at the conjugate second focal point the EM energy reflected off the coating of the reflector wherein the means for sensing includes means for selecting a sensor from a set of sensors; and means for processing the sensed EM radiation to characterize the area of the coating with respect to a reference set of data.

\* \* \* \* \*

UNITED STATES PATENT AND TRADEMARK OFFICE
CERTIFICATE OF CORRECTION

| | |
|---|---|
| PATENT NO. | : 7,295,293 B2 |
| APPLICATION NO. | : 11/256232 |
| DATED | : November 13, 2007 |
| INVENTOR(S) | : Anurag Gupta et al. |

It is certified that error appears in the above-identified patent and that said Letters Patent is hereby corrected as shown below:

In column 9, line 39, in Claim 12, after "claim" insert -- 1 --.

In column 11, line 2, in Claim 31, after "limiting the" delete "is".

Signed and Sealed this

Twenty-second Day of July, 2008

JON W. DUDAS
*Director of the United States Patent and Trademark Office*